(12) United States Patent
Parruck et al.

(10) Patent No.: US 6,198,723 B1
(45) Date of Patent: Mar. 6, 2001

(54) ASYNCHRONOUS TRANSFER MODE TRAFFIC SHAPERS

(75) Inventors: Bidyut Parruck, San Jose, CA (US); Pramod B. Phadke, Mumbai; Sachin N. Pradhan, Nigadi, both of (IN); Akash Bansal; Kishalay Haldar, both of San Jose, CA (US)

(73) Assignee: Paxonet Communications, Inc., Fremont, CA (US)

( * ) Notice: Subject to any disclaimer, the term of this patent is extended or adjusted under 35 U.S.C. 154(b) by 0 days.

(21) Appl. No.: 09/060,228

(22) Filed: Apr. 14, 1998

(51) Int. Cl.[7] .............................. H04J 3/16; H04L 12/56
(52) U.S. Cl. ........................ 370/230; 370/395; 370/412
(58) Field of Search .................................. 370/230, 395, 370/412, 413, 411, 428, 468, 232, 414, 538

(56) References Cited

U.S. PATENT DOCUMENTS

| | | | |
|---|---|---|---|
| 5,390,176 | 2/1995 | Schoute et al. | 370/395 |
| 5,619,510 | 4/1997 | Kurano | 714/712 |
| 5,677,906 | 10/1997 | Hayter et al. | 370/235 |
| 5,689,508 | 11/1997 | Lyles | 370/391 |
| 5,719,865 | 2/1998 | Sato | 370/395 |
| 5,734,650 | 3/1998 | Hayter et al. | 370/391 |
| 5,850,399 | * 12/1998 | Ganmukhi et al. | 370/235 |
| 5,864,540 | * 12/1998 | Bonomi et al. | 370/235 |

OTHER PUBLICATIONS

International Search Report, ISA/US.

* cited by examiner

*Primary Examiner*—Chau Nguyen
*Assistant Examiner*—Soon-Dong Hyun
(74) *Attorney, Agent, or Firm*—Martine Penilla & Kim, LLP

(57) ABSTRACT

The invention relates, in one embodiment, a computer-implemented method for shaping the output of cells on an output path of a data transmitting device. The data transmitting device is configured for switching the cells from a plurality of input paths to the output path to a network. In one embodiment the method includes sorting a plurality of queues, each queue including a plurality of cells associated with a communication device. The plurality of queues are arranged according to a weight and a data rate associated with each plurality of cells resulting in a plurality of sorted queues of queues. An aggregate output of cells from each sorted queue of queues is regulated based upon the data rates of the queues of the each sorted queue of queues. And, the output of the aggregate output of cells from each sorted queue of queues is regulated based upon the weights of the each sorted queue of queues, such that the scheduled output is coupled to the output path. The scheduled output conforms to a plurality of characteristics of the network, such that the network is efficiently used to carry the cells from the plurality of input paths to a plurality of communication devices. Thereby, apparatuses and methods of traffic shaping are disclosed herein.

13 Claims, 11 Drawing Sheets

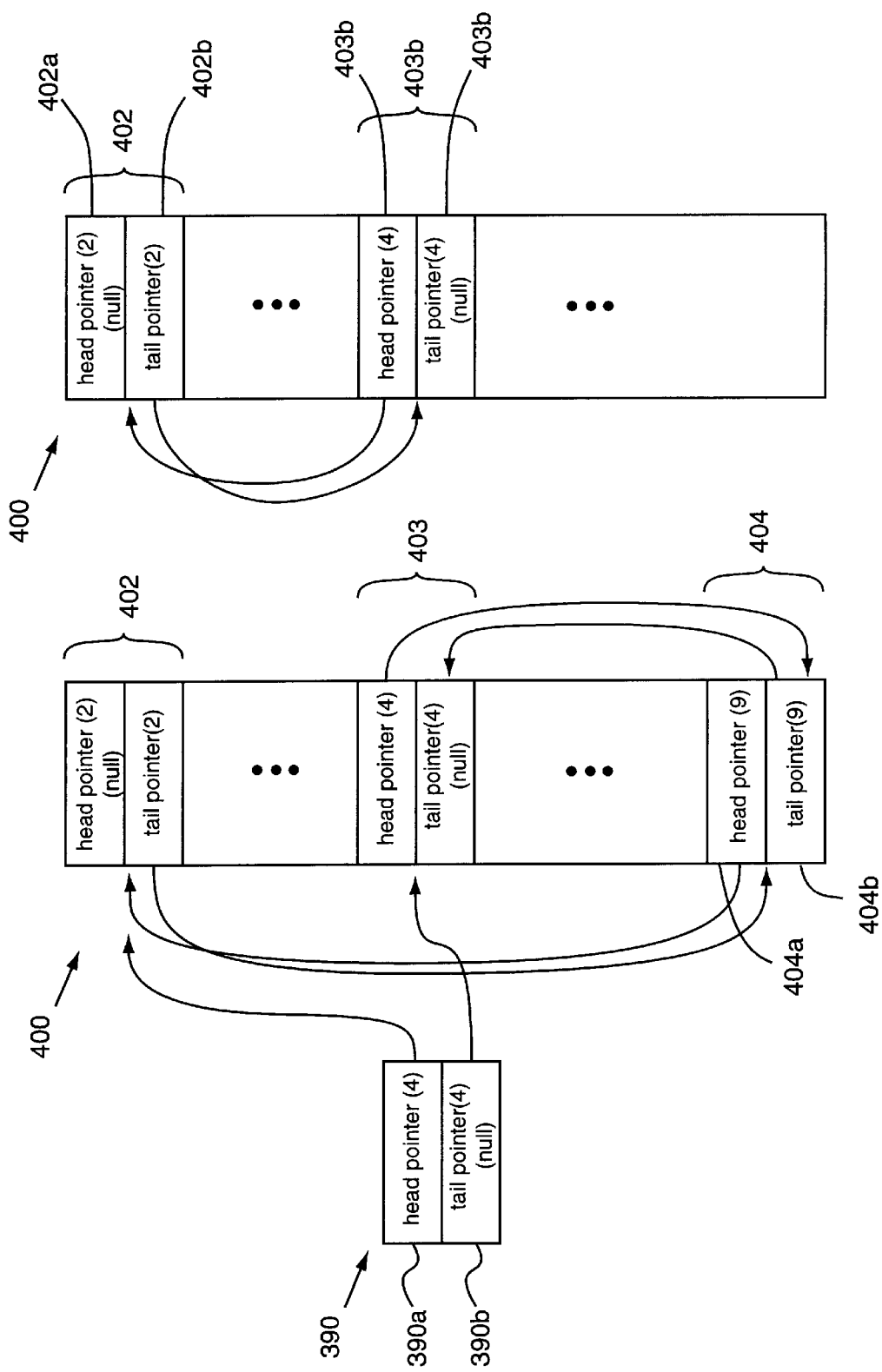

ASYNCHRONOUS TRANSFER MODE TRAFFIC SHAPERS

BACKGROUND OF THE INVENTION

The present invention relates to digital data networks. More particularly, the present invention relates to an apparatus and method for improving communication among devices that are coupled to Asynchronous Transfer Mode (ATM) digital data networks.

Asynchronous Transfer Mode is an emerging technology in the fields of telecommunication and computer networking. ATM permits different types of digital information (e.g., computer data, voice, video, and the like) to intermix and transmit over the same physical medium (i.e., copper wires, fiber optics, wireless transmission medium, and the like). ATM works well with data networks, e.g., the Internet, wherein digital data from a plurality of communication devices such as video cameras, telephones, television sets, facsimile machines, computers, printers, and the like, may be exchanged.

To facilitate discussion, FIG. 1 illustrates a prior art data network 3, including ATM switches 5 and 10 and a plurality of communication devices 22–24, 32, 42–44, 52, 62–63, 72–74 and 82–85. ATM switches 5 and 10 may represent a digital switch for coupling, for either bidirectional or unidirectional transmission, two or more of the communication devices together for communication purpose and may represent a data network such as a local area network (LAN), a wide area network (WAN), or the global data network popularly known as the Internet.

Each communication device 22–24, 42–44, 52, 62–63, 72–74 and 82–85 can be part of smaller networks 21, 41, 51, 61, 71 and 81, and coupled to ATM switch 5 or 10 through input and output ports and physical connections 20, 40, 50, 60, 70 or 80. A communication device, such as video server 32, can also be connected directly to the ATM switch through a physical connection 30. The smaller networks or the ATM switches may include circuitry to translate data from the communication devices into an ATM data format for transmission via the ATM switches, and to translate ATM data transmitted via the ATM switches into data formats compatible with the communication devices.

Irrespective of the source, data is transformed into an ATM data format prior to being transmitted via an ATM-enabled network. As is well known, a typical ATM data cell 2 includes a header portion and a data portion. Cell header portion may include information regarding the type of information being encapsulated in the ATM data cell, e.g., the destination for that information, and the like. Cell data portion typically includes the information being sent. By standardizing the format of the ATM cells, information from different communication devices may be readily intermixed and transmitted irrespective of its original format.

In the implementation of ATM technology in a data network, the challenge has been to improve the efficiency with which ATM switches 5 and 10 handle multiple simultaneous connections among the multiple communication devices. For peak efficiency, it is generally desirable to have an ATM switch transmit at the highest bandwidth that the network can handle, while at the same time minimizing delay and maximizing data integrity. Unfortunately, the high bandwidth demanded by such a design generally results in a prohibitively expensive ATM switch.

The standards for ATM networks have required that ATM switches be capable of a certain level of quality of service (QoS). For example, the ATM Forum Technical Committee has published a Traffic Management Specification, version 4.0, April 1996, which lays out the specifications for quality of service, which is incorporated herein by reference for all purposes. Some of the criteria of QoS include Peak-to-Peak Cell Delay Variation (peak-to-peak CDV), Maximum Cell Transfer Delay (maxCTD), Cell Loss Rate (CLR), Cell Error Ratio (CER), Severely Errored Cell Block Ratio (SECBR) and Cell Misinsertion Rate (CMR), as well as other characteristics of a connection. Additionally, each connection may be classified as certain types of connections, including constant bit rate, real time variable bit rate, non-real time variable bit rate, unspecified bit rate and available bit rate. Each type of classification requires a certain QoS criteria.

The QoS criteria must be met by all ATM networks and switches. At the same time it is recommended that traffic shaping be performed in order to maximize the efficiency of any given connection. Traffic shaping alters the characteristics of a stream of cells to best fully utilize the capabilities of the connection.

Referring back to FIG. 1, a user may wish to use telephone 22 to communicate with telephone 85. Telephone 22 begins to transmit cells 2 with the appropriate header and body. Among the cells 2 are resource management (RM) cells 2' (not shown). Resource cells 2' are sent out through the ATM network 3 and is eventually returned to either ATM switch 5 or network 21, which ever is sending the cells in an ATM format. The resource cell informs the switch, in this case ATM switch 5, about the characteristics of the connection between telephone 22 and telephone 85. The connection formed between the telephones 22 and 85 is a virtual circuit (VC) since it is formed from a myriad of potential circuits throughout the vast network and is not a permanent physical connection. The physical pathway, or a logical grouping of virtual circuits, used to form the virtual connection are virtual paths (VP).

The VC from telephone 22 consists partly of network 21, physical connection 20 and ATM switch 5. ATM switch 5 and ATM switch 10 are linked through physical connections 12 and 13. Between these connections 12 and 13 there can be any number of other switches, networks and connections through which the VC is connected. From ATM switch 10 the VC continues through physical connection 80, network 81 and finally to telephone 85.

Traffic shaping is desired because the characteristics of the VC should be considered in order to fully utilize the particular VC. For example, telephone 22 may need to communicate with telephone 85 at 64 kbps at a constant bit rate since voice communication is typically constant. Connections 12 and 13 between ATM switches 5 and 10 are typically capable of handling high bandwidth communications in the order of 45 Mbps or more. However, connections 20 and 80 may be more limited. In many cases, connections between a network and an ATM switch may be 1.544 Mbps. Still, 1.544 Mbps is great enough to handle the virtual connection between telephone 22 and telephone 85. But, one reason for traffic shaping is to fully utilize the 45 Mbps connections 12 and 13 rather than tying up the high bandwidth connections with only the 64 kbps transmissions.

In another example, video server 32 may wish to communicate with television 82 at a non-real time variable bit rate. The video server and connection 30 may be capable of transmitting at up to 30 Mbps. However, connection 80 may be only capable of handling 1.544 Mbps, and cannot handle 30 Mbps communications. Thus, the output of the video server should be shaped to communicate at 1.544 Mbps.

A bottleneck may occur when both telephone 22 and video server 32 are communicating with telephone 85 and television 82 at the same time, respectively. Therefore, traffic shaping is required to ensure that only a maximum of 1.544 Mbps is being transmitted to network 81, otherwise information may be corrupted or lost, and thus QoS standards not met.

In the prior art, many ATM techniques of traffic shaping have been proposed to efficiently use the ATM network while still meeting QoS criteria. One practice condoned by the ATM forum has been to not utilize any traffic shaping, and simply ensure that QoS criteria have been met. As can be appreciated, this approach while simplistic and less expensive than traffic shaping, fails to properly utilize the full potential of an ATM network.

FIG. 2 is a block diagram of a prior art method of traffic shaping implemented in an ATM switch. In this figure and the figures that follow, a convention has been adopted for ease of illustration and understanding. It is assumed herein that ATM connections on the left side of a depicted ATM switch represent ATM input connections. Contrarily, ATM ports illustrated on the right side of a depicted ATM switch represent ATM output connections. In reality, most ATM ports are bidirectional and may be disposed at any location relative to the ATM switch. Furthermore, although only a few ATM connections are shown herein, the number of ATM connections coupled to a given ATM switch is theoretically unlimited. Accordingly, the convention is employed to facilitate discussion only and is not intended to be limiting in anyway.

Typically, the prior art method of traffic shaping implements a traffic shaper 95 for every VC queue 92. A VC queue has a queue of cells associated with a particular VC. Generally, an ATM switch sorts the incoming cells from the various connections and groups them by their respective VC. For example, the cells that are part of the communication from telephone 22 to telephone 85 can be grouped together in VC queue 92(5). And, cells from video server 32 to television 82 can be grouped in VC queue 92(1). The cells of a VC queue are typically ordered by the sequence at which they arrived at the ATM switch.

The cells arrive at the traffic shapers where they wait for eventual transmission by router 97. The traffic shapers trickle out the cells to the router based upon certain criteria. One criteria may be data rate. Typically, a VC having a higher data rate requirement than another is allowed to trickle out more cells per time period than a VC with a lower data rate requirement. Thus, the traffic shapers trickle out cells at different rates. The cells are grouped together into a continuous stream of cells by router 97, typically to fully utilize the bandwidth of output connection 12.

The traffic shaper method may help to fully utilize high bandwidth output connection 12, but the method requires a traffic shaper for every VC queue. Implementing a traffic shaper for every virtual connection established by an ATM switch can be prohibitively computationally intensive, and therefore expensive and overly complex. Further, the prior art method may not fully alleviate the situation of overloading a lower bandwidth connection further downstream in the virtual path.

FIG. 3a is a block diagram of a prior art timing chain method of traffic shaping implemented in an ATM switch. In the timing chain method the cells of the VC queues 92 are scheduled by timing chain router 99 based upon the data rate of the particular VC queue.

FIGS. 3b and 3c are block diagrams of an implementation of a prior art timing chain router 99. The cells of the various VC queues arrive at the left side of the timing chain router 99. In the example, timing chain router 99 receives cells from five different VC queues. The cells are labeled a–e for VC queues A–E (not shown).

Typically, timing chain router 99 prepares a number of packets 100(0)–100(9) to send in the next time interval. By way of example, if the output data rate of timing chain 99 is equivalent to 10 packets per millisecond, timing chain router 99 may prepare the next 10 packets to send in the next millisecond.

The VCs may have different data rates and priorities. In this example of a typical timing chain algorithm, VCs A and B may be of equal priority with a data rate of 2 cells per millisecond. VCs C, D and E may be of equal priority, lower than the priority of VCs A and B, VC C requiring 4 cells per millisecond, and VCs D and E requiring 1 cell per millisecond. Under these assumptions timing chain router 99 may sort the cells from VC queues A–E in a first sort 100.

The first sort 100(0) was able to accommodate the priorities and data rates of all the VCs. Typically, timing chain router 99 would have provided cell slots 100(0)–(9) to VC queues A and B because of their higher priority. Timing chain router 99 assigns cell slots 100(0)–(9) according to the arrival times of the cells and the next available cell slot 100(0)–(9). The sequence of cells 100 may have occurred as illustrated if some "c" cells were already present and the "a" and "b" cells arrived later and placed in the earliest open cell slots 100(0), (1), (4) and (5). Finally, cells "d" and "e" were placed in the remaining slots 100(8) and (9). Fortunately, enough cell slots were available to accommodate all the VC queues.

FIG. 3c depicts a second sort 100' of cell slots 100(0)–(9). If a new VC A' is established with the same data rate and priority as A the a' cells must be inserted into the sort 100. In the new sort 100' the a' cells displace cells of lower priority. In the example, the "c" cells are pushed back and the "d" and "e" cells are completely removed from the new sort 100'. Using the timing chain method almost the entire sort 100 had to be reordered in order to accommodate the new VC. Typically, a timing chain is significantly longer than the illustrative example. Additionally, the timing chain becomes more complex as the output data rate of the timing chain is increased. Thus, typical timing chain routers require a large amount of computational power to continually reorganize the timing chain.

Thus, the use of a timing chain method is overly complex. Using the timing chain method requires resorting of cells, which is generally complicated and requires a large amount of computational resources. Additionally, the timing chain method is unpredictable. As in the case of the example VCs D and E may have been delayed, terminated or rerouted. Typically, VCs D and E may be required to establish a new VC using a different route, however, an interruption in the connection may have occurred. Also, VC C may have been interrupted instead of VCs D and E.

As can be appreciated from the foregoing, ATM switch designers are constantly searching for ways to improve switch performance and to lower implementation cost. Particularly, there are desired improved ATM switching architectures and methods therefor that advantageously maximize the efficiency of ATM cell transmission for multiple simultaneous connections. The desired ATM switching architectures and methods therefor preferably include structures and techniques for effectively shaping the output traffic of an ATM device while meeting QoS criteria, thereby maximizing performance of an ATM output device.

SUMMARY OF THE INVENTION

The invention relates, in one embodiment, to a computer-implemented method for shaping the output of cells on an output path of a data transmitting device. The data transmitting device is configured for switching the cells from a plurality of input paths to the output path to a network. In one embodiment the method includes sorting a plurality of queues, each queue including a plurality of cells associated with a communication device. The plurality of queues are arranged according to a weight and a data rate associated with each plurality of cells resulting in a plurality of sorted queues of queues. An aggregate output of cells from each sorted queue of queues is regulated based upon the data rates of the queues of each sorted queue of queues. And, the output of the aggregate output of cells from each sorted queue of queues is regulated based upon the weights of the each sorted queue of queues, such that the scheduled output is coupled to the output path. Thereby, the scheduled output conforms to a plurality of characteristics of the network, such that the network is efficiently used to carry the cells from the plurality of input paths to a plurality of communication devices.

In another embodiment, a network switch for receiving a plurality of cells from a first plurality of communication devices from a plurality of input paths and outputting the cells to an output path to a second plurality of communication devices is disclosed. The plurality of virtual circuits are created between the first and second plurality of communication devices, each virtual circuit having a weight and a data rate. The apparatus includes a virtual circuit manager, a plurality of traffic shaper link lists, a plurality of traffic shapers and a scheduler.

In yet another embodiment, the virtual circuit manager sorts the plurality of cells into queues, each queue being further sorted by weight and data rate. The plurality of traffic shaper link lists organize the sorted queues.

In a further embodiment, each traffic shaper link list includes a non-aggregate linklist and an aggregate link list, the aggregate linklist keeping track of a sequence of a first subset of the sorted queues corresponding to a first subset of virtual circuits having a first data rate. The non-aggregate linklist keeps track of a sequence of a second subset of the sorted queues corresponding to a second subset of virtual circuits having an aggregate data rate approximately equal to the first data rate. Each traffic shaper link list also includes a link table, the link table keeping track of a beginning and an end of the first and second sequences. Each traffic shaper link list schedules the queues of the corresponding sorted queues to output cells.

In a further embodiment, the plurality of traffic shapers, each traffic shaper corresponding to a one of the plurality of traffic shaper link lists, controls the scheduled output of cells from the corresponding sorted queues. The traffic shaper allows the corresponding sorted queues to output cells when the traffic shaper is triggered.

In yet another embodiment, the scheduler gives permission to the traffic shapers. Permission is given to a plurality of subsets of the plurality of traffic shapers, each subset of the plurality of traffic shapers corresponding to a queue of the sorted queues, according to the weight of the cells within the corresponding queue of the sorted queues. Thereby the output of cells is coupled to the output port and the sequence of the output of cells is shaped to take advantage of a plurality of characteristics of each of the virtual circuits.

These and other advantages of the present invention will become apparent upon reading the following detailed descriptions and studying the various figures of the drawings.

BRIEF DESCRIPTION OF THE DRAWINGS

FIGS. 3b and 3c are block diagrams of an implementation of a prior art timing chain router of FIG. 3a.

FIG. 9a illustrates a scheduler linklist 400 in accordance with one embodiment of the present invention.

FIG. 9b illustrates a scheduler linklist after a deactivation of a traffic shaper link in accordance with one embodiment of the present invention.

DESCRIPTION OF THE PREFERRED EMBODIMENTS

Figure 1:
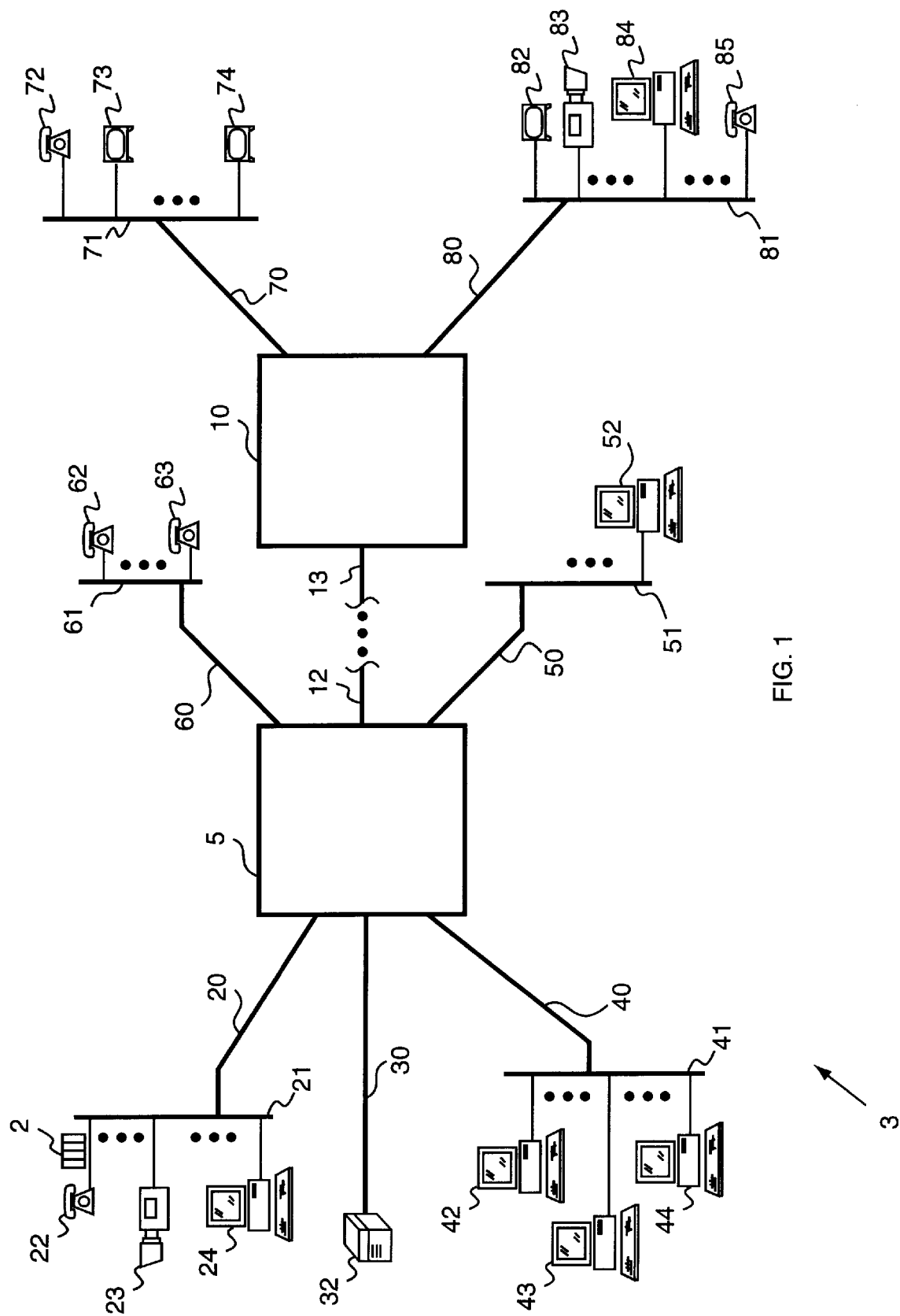
FIG. 1 illustrates a prior art data network.
Figure 2:
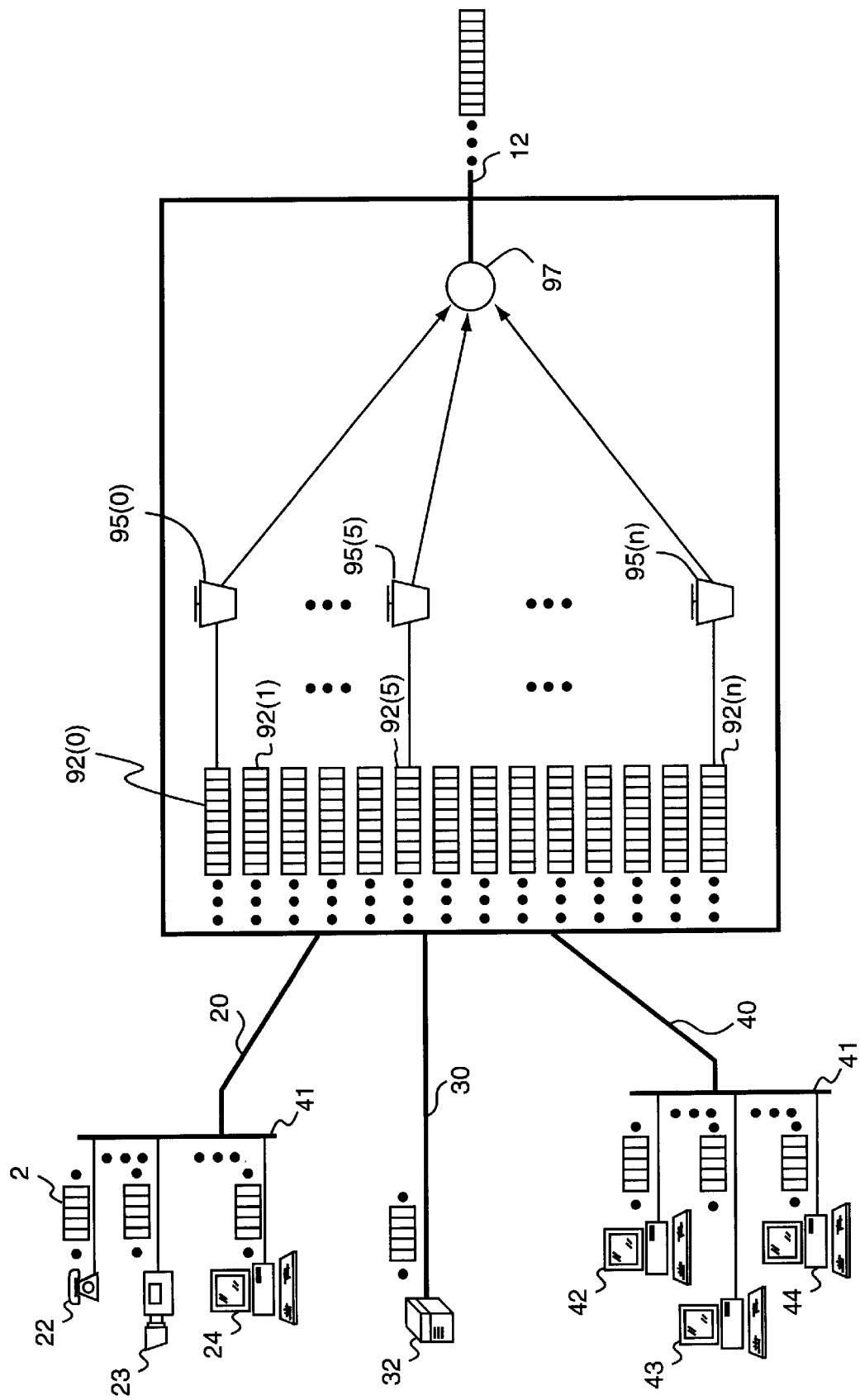
FIG. 2 is a block diagram of a prior art method of traffic shaping implemented in an ATM switch.
Figure 3A:
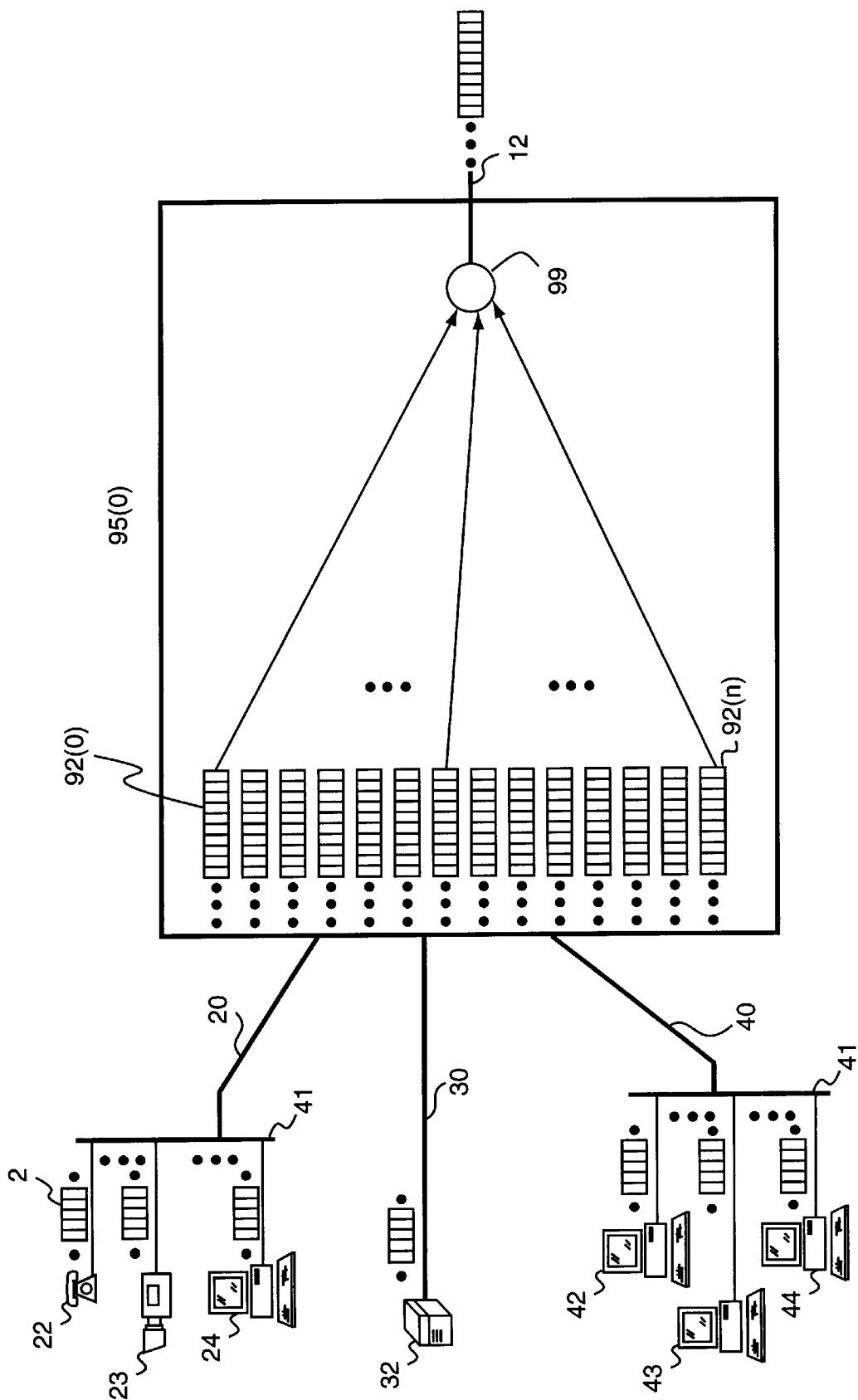
FIG. 3a is a block diagram of a prior art timing chain method of traffic shaping implemented in an ATM switch.
Figure 3B:
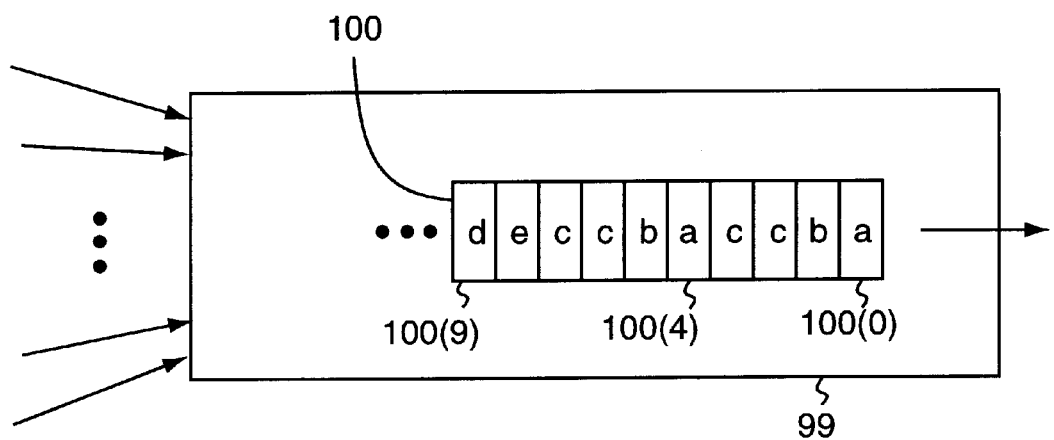
Figure 3C:
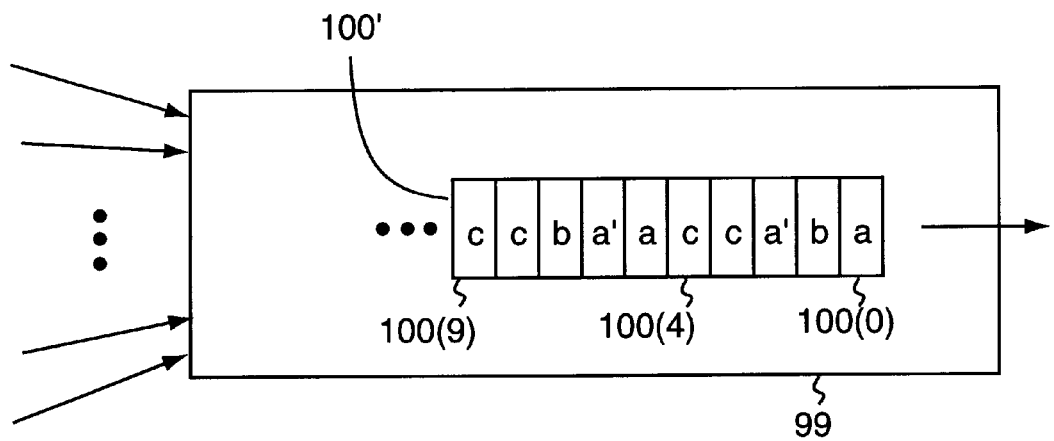

An invention is described for improving communication among devices that are coupled to digital data networks. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

As discussed, prior art methods of shaping data communications typically require a great amount of computational resources to implement. The prior art systems utilized individual traffic shaping for each VC queue, repetitive sorting, time chaining or other types of cumbersome methodologies. Typically, all of these methods require great amounts of computational power to implement. Further, the prior art systems may not be able to adequately shape traffic to best utilize the different characteristics of each virtual connection. It may be appreciated that much of the deficiencies of prior art systems occurs due to the brute force nature of the prior art solutions to the problems at hand. The present invention envisions a more elegant, therefore more efficient, solution to traffic shaping.

The present invention provides for an improved method and apparatus for shaping data communications between communication devices. The improved method and apparatus allow for better traffic shaping to more fully utilize the virtual connections between communication devices. One aspect of the present invention includes the grouping of VC queues with similar data rates such that their traffic may be shaped by a single traffic shaper. Using a single traffic shaper for a number of VC queues reduces the number of traffic shapers required, rather than providing a traffic shaper for each VC queue.

Additionally, VC queues with lower data rates may be aggregated together to form an aggregated output that may also be grouped with other VC queues of the greater data rate. In this manner, a single traffic shaper, in accordance with one embodiment of the present invention, may be able to handle a large variety of data rates. At the same time, no significant amount of additional computational resources are typically required to add the additional flexibility.

Another aspect of the present invention is prioritizing by traffic shapers rather than per VC queue. Further, priority is determined by a variety of factors rather than simply one single criteria. Thus, more robust traffic shaping may be achieved by the present invention. And, by prioritizing by groups of VC queues traffic shaping is achieved with fewer resources.

The present invention is typically cheaper and easier to implement than prior art traffic shaping methodologies. The present invention provides a more robust system of shaping traffic, such that a variety of types of data communications may be established and maintained efficiently.

The present invention is described primarily in the embodiment of an ATM switch, however the present invention is applicable to any type of data transmitting device capable of outputting data encapsulated in cells or data packets. By way of example, the present invention can be implemented in network interface cards, local area network switches and routers, wide area network switches and routers, repeaters and any other suitable communication device.

Figure 4:
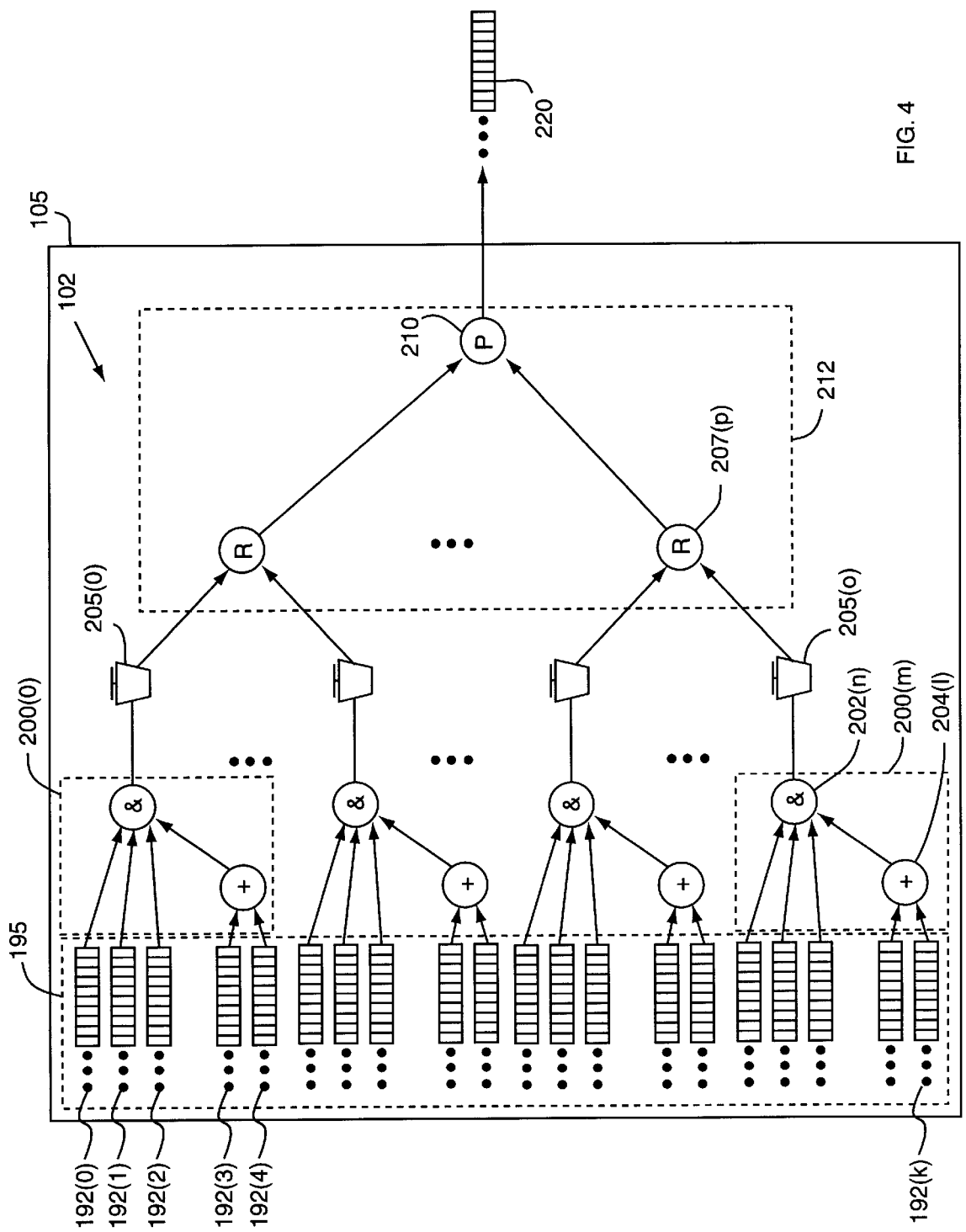
FIG. 4 is a block diagram of a traffic shaping matrix 102 in accordance with one aspect of the present invention.

FIG. 4 is a block diagram of a traffic shaping matrix 102 in accordance with one aspect of the present invention. As stated, traffic shaping matrix 102 can be implemented in any type of data communications output device, although the illustrated embodiment contemplates the implementation of the traffic shaper in an ATM switch 105.

Traffic shaping matrix 102 includes a VC manager 195, traffic shaper queues of queues 200(0)–200(m), traffic shapers 205(0)–205(o) and a scheduler 212. VC manager 195 maintains VC queues 192(0)–192(k). Each VC queue 192 corresponds to a virtual circuit and a particular communication device. A VC queue is a queue of cells received from the associated communication device. The elements of the traffic shaping matrix are best understood in conjunction with the following figures along with FIG. 4.

VC manager 195 receives all the cells from all the communication devices that input to ATM switch 105. The cells are sorted by their associated VC, as depicted in FIG. 4. Thus, VC queue 192(0) is comprised of cells from one communication device, and VC queue 192(k) is comprised of cells from another communication device, and so on.

The VC queues feed into traffic shaper queues of queues (TSQoQ) 200(0)–(m). Each TSQoQ includes an AND router 202 and one or more OR routers 204. The output of the OR routers 204 feed into the AND router along with the VCs that feed directly into the AND router. The output of the AND router is received by a traffic shaper 205.

The outputs of several traffic shapers feed into scheduler 212. Scheduler 212 includes several round robin routers 207 and a priority scheduler 210. The output of the priority scheduler is the output of a port of the ATM switch to one of the physical connections.

As can be appreciated, the structure of traffic shaping matrix 102 resembles a tree structure. This is due to the hierarchical structure of the traffic shaping matrix. Starting from the root, priority scheduler 210 schedules the transmission of cells from the round robin routers based upon priority. In the illustrated embodiment, each round robin router 207 is assigned a priority, and each VC feeding into the same round robin router has the same priority. By way of example, all VCs that require a constant bit rate may be fed into the round robin with the highest priority, and all VCs that require a real time variable bit rate may be fed into the round robin with the next highest priority, and so on. By way of further example, all VCs carrying voice traffic may be fed into the round robin with the highest priority, and all VCs carrying video traffic may be fed into the round robin with the next highest priority. However, the round robin scheduler can be based on any type of QoS criteria other than priority.

The round robin routers, in turn, permit the transmission of cells from the traffic shapers 205. Traffic shapers trigger according to how "full" they are, as discussed further herein. In one embodiment, triggering is based upon the data rates of the VC queues feeding into the traffic shapers. Each traffic shaper transmits at a data rate that is the sum of the data rates of the VC queues feeding into the traffic shaper. Each traffic shaper may transmit at higher data rates as more VC queues are added to the input of the traffic shaper. Thus, the output of the traffic shaper is dynamically adjusted to service the needs of the number of valid VCs.

By way of example, traffic shaper 205(0) is transmitting to round robin router 207(0) at a fundamental rate of 10 Mbps. VC manager sorts the VC queues such that only VC queues with the same priority and same data rate feed directly into the same AND router. Thus, VCs 192(0)–(2) all have the same priority and the same data rate, or fundamental data rate, 10 Mbps in one embodiment.

Similarly, VC manager sorts all the VC queues with the same priority and data rate to feed into the same OR router. However, the maximum data rate of the VCs feeding into the OR router 204 equals the fundamental data rate. In one embodiment, VC queues 192(3) and 192(4) have data rates of 5 Mbps. The sum total of all the VC queues feeding into traffic shaper 205(0) totals 40 Mbps. The VC queues feeding into OR routers 204 are called aggregate VC queues, while the VC queues feeding directly to AND routers 202 are non-aggregate VC queues.

In actuality TSQoQ 200(0) is retrieving cells from the various VC queues 192(0)–(4) for transmission at the rates associated with the VCs. By way of example, the fundamental rate for TSQoQ may be 10 Mbps, which corresponds to the rate at which data is received by AND router 202(0). A typical cell is typically composed of 53 octets or 424 bits of information. Therefore, TSQoQ 200(0) will retrieve one cell from each non-aggregate VC queue 192(0)–(2) approximately every 42.4 microseconds, amounting to 30 Mbps of information.

However, the TSQoQ cannot retrieve cells from the aggregate VC queues 192(3)–(4) at such a high rate because of the problem of overloading downstream connections and/or the receiving communication devices. To ensure that the traffic for the slower VCs are properly shaped and provide effective communication, the TSQoQ alternately retrieves cells from the aggregate VC queues. In the present example, TSQoQ 205(0) will retrieve a cell from aggregate VC queue 192(3) every other 42.4 microseconds (i.e., every 84.8 microseconds), and alternately from aggregate VC queue 192(4) during alternate 42.4 microsecond intervals. Together, the data rate for the two aggregate VC queues amounts to 10 Mbps, but each active aggregate VC queue 192(3) and 192(4) transmits at equal divisions of the 10 Mbps, or 5 Mbps in the illustrated example.

In one embodiment, OR router 204(0) retrieves data from two aggregate VC queues 192(3)–(4) with data rates that are one half the data rate of the fundamental data rate. However, OR routers can handle any number of aggregate VC queues transmitting at the appropriate division of the fundamental data rate. By way of example, five aggregate VC queues each at one fifth of the fundamental data rate can be handled by a single OR router, or six aggregate VC queues at one sixth of the fundamental data rate, and so on.

Alternatively, more than one aggregate VC queue may be active, but only one may contain cells ready for transmission. In that case, the active aggregate VC queue is allowed to transmit at the full fundamental rate.

In another embodiment of the present invention, more than one OR router can be utilized in a TSQoQ. By way of example, three aggregate VC queues at one third of the fundamental data rate can be handled by one OR router, while a second OR router handles four aggregate VC queues at one fourth the fundamental data rate. Thus, a variety of VCs operating at different data rates, but at the same priority, can be handled by a traffic shaper in accordance with the present invention. This allows multiple sets of VCs to share the same fundamental rate of transmission, and provide a more versatile traffic shaping system.

In yet another embodiment, aggregate VC queues operating at different data rates can be handled by a single OR router so long as the aggregate data rate is equal to the fundamental data rate. By way of example, if the fundamental data rate is 10 Mbps an OR router can handle two aggregate VC queues at 2.5 Mbps and a single VC queue at 5 Mbps. During operation, the 5 Mbps VC queue is polled every other timer interval, while the other aggregate VC queues are alternately polled in between the polling of the 5 Mbps VC queue. Thereby, the arrangement of VC queues per TSQoQ can be dynamically arranged by VC manager 195 to minimize the number of OR routers 204 that are implemented.

The outputs of AND routers 202 feed into a traffic shaper 205. Traffic shapers, in conjunction with the associated TSQoQ 205, schedules the transmission of cells from the underlying VC queues. Traffic shapers are triggered according to the fundamental data rate of the VC queues feeding into the TSQoQ, but the output of the traffic shaper is the aggregate of all the underlying VC queues.

As a whole, the configuration of traffic shaping matrix 102 in one embodiment reduces the number of traffic shapers that need to be implemented. The use of OR and AND routers also effectively shape the traffic of each VC such that the QoS criteria is met while maximizing the bandwidth of the various connections between two communicating devices. As discussed further herein, the use of TSQoQs in conjunction with traffic shapers 205 shape traffic in order to fully utilize the high bandwidth connections that typically exist between ATM switches, while ensuring that lower bandwidth connections are not overloaded downstream. The round robin and priority schedulers also perform traffic shaping in a method much easier to implement than prior art timing chain methods.

Figure 5:
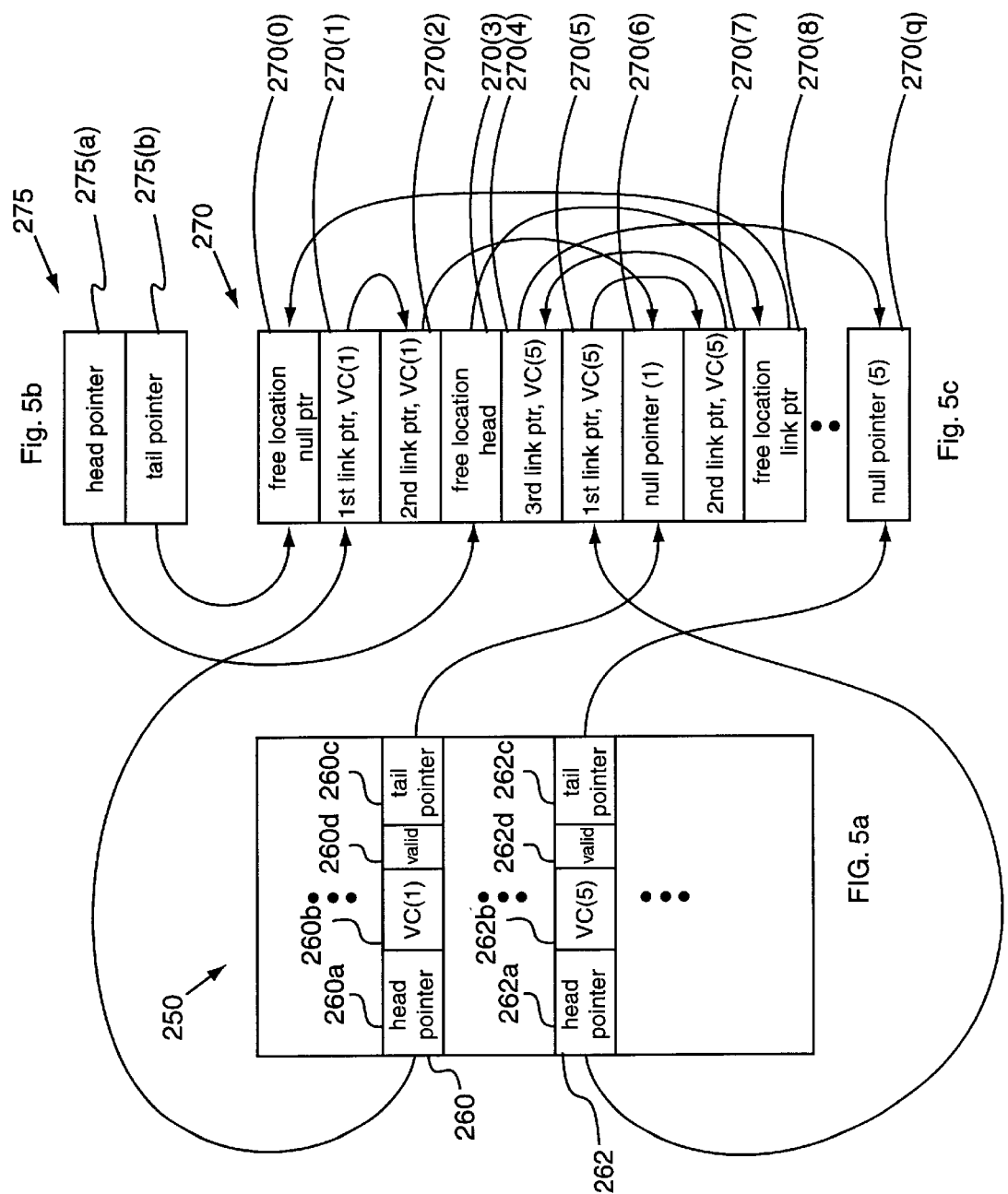
FIGS. 5a, 5b and 5c illustrate a VC manager queue 250, a free memory pointer 275 and a VC cell queue 270, respectively in accordance with one embodiment of the present invention.

FIGS. 5a, 5b and 5c illustrate a VC manager queue 250, a free memory pointer 275 and a VC cell queue 270, respectively. FIGS. 5a–5c are best understood in conjunction with FIG. 4.

VC manager 195 keeps track of the arriving cells through VC manager queue 250, free location pointer 275 and VC cell queue 270. The incoming cells are stored in an input buffer (not shown) as they are received by the ATM switch. VC cell queue 270 is a list of pointers 270(0)–(q) that correspond to the memory locations of the input buffer containing a cell. Each pointer 270 can also be a pointer to a successive cell.

By way of example, a first link pointer for a first VC, VC(1) 270(1), points to the memory location in the input buffer of the first cell received from VC(1) by ATM switch 105. Additionally, it also points to the second link pointer of VC(1) 270(2), which corresponds to the memory location of the input buffer of the second cell received from VC(1). The link pointers successively point to the next in line link pointer.

The last link pointer is a null pointer 270(6) and 270(q). In the illustrated embodiment, null pointer 270(6) corresponds to the memory location of the last cell received by the ATM switch. But, instead of also pointing to the next successive link, the null pointer points to itself since there are no more cells in the sequence.

VC manager 195 keeps track of all the received cells partially by the use of the VC cell queue 270, and also through VC manager queue 250. The VC manager queue is a list of all the active VCs that are connected to the ATM switch. Each VC is assigned a VC pointer 260 and 262. VC pointers 260 and 262 point to the head and the tail of the beginning and the end of the link pointer sequence associated with the particular VC.

In one embodiment, VC pointer 260 corresponds to VC(1). Head pointer 260a points to the first cell in the sequence of cells in VC cell queue 270 associated with VC(l). VC marker 260b indicates the VC with which the VC pointer is associated. VC tail pointer 260c points to the null pointer 270(6) associated with the VC.

VC pointers 260 and 262 may also include a valid flag 260d and 262d, respectively. The valid flags 260d and 262d indicate whether the particular VC is valid. That is, if there are no cells queued up in a particular VC then the valid flag is reset. As soon as one or more cells are queued up in the VC the valid flag is asserted for that VC. In the illustrated embodiment, valid flags 260d and 262d are set since VC(1) and VC(5) contain cells.

Free location pointer 275 includes a free location head pointer 275a and a free location tail pointer 275b. The free location head pointer points to a first free memory location pointer 270(3) of a sequence of free memory locations 270(3), 270(8) and 270(0), much like the sequence of VC link pointers. Free location tail pointer 275b points to the last free memory location pointer in the sequence of free memory location pointers. The free memory location pointer sequence keeps track of all the available free memory locations available for incoming cells.

By way of example, head pointer 262a of VC marker 262 points to a first link pointer of VC(5) 270(5), which points to the input buffer memory location of the first cell of VC(5). The first link pointer points to the rest of the sequence of link pointers 270(7), 270(4) and 270(q). Tail pointer 262c points to the end of the sequence, null pointer 270(q).

When ATM switch 105 receives a new cell for VC(5) the cell is placed in the memory location 270(3) in the input buffer pointed to by head free memory location pointer 275(a). Head free memory pointer 275a can then be pointed to the free memory location pointer next in line, in the illustrated embodiment 270(8).

The memory location pointer 270(3) then becomes a link pointer, pointing at the memory location of the new cell. The VC manager looks at the tail pointer of VC(5) 262c in order to place the new link pointer at the end of the link pointer sequence for VC(5). As a link pointer, the new link pointer 270(3) is a null pointer because it is placed at the end of the VC(5) link pointer sequence, and the previously last link pointer 270(q) points to the new null pointer 270(3). Thus, the new link pointer sequence for VC(5) becomes 270(5), 270(7), 270(4), 270(q) and 270(3). The tail pointer for VC(5) is accordingly pointed at the new null pointer 270(3).

When a cell is transmitted, the cell may be removed from the input buffer and the associated link pointer is reallocated as a free memory location pointer. By way of example, when VC(5) is allowed to transmit the first cell in its queue VC manager 195 looks at the head pointer for VC (5) 260a to locate the first link pointer 270(5). After looking at the free memory location tail pointer 275b, the first link pointer 270(5) is reallocated as a free memory location pointer and is placed at the end of the free memory location sequence. The free memory location tail pointer 275b then points to the new last free memory location pointer 270(5), and the previously last free memory location pointer 270(0) is also pointed at 270(5). The head pointer for VC(5) is then pointed at the next link pointer in the sequence 270(7). In this manner, VC manager 195 can keep track of the sequences of cells for each active VC.

Figure 6:
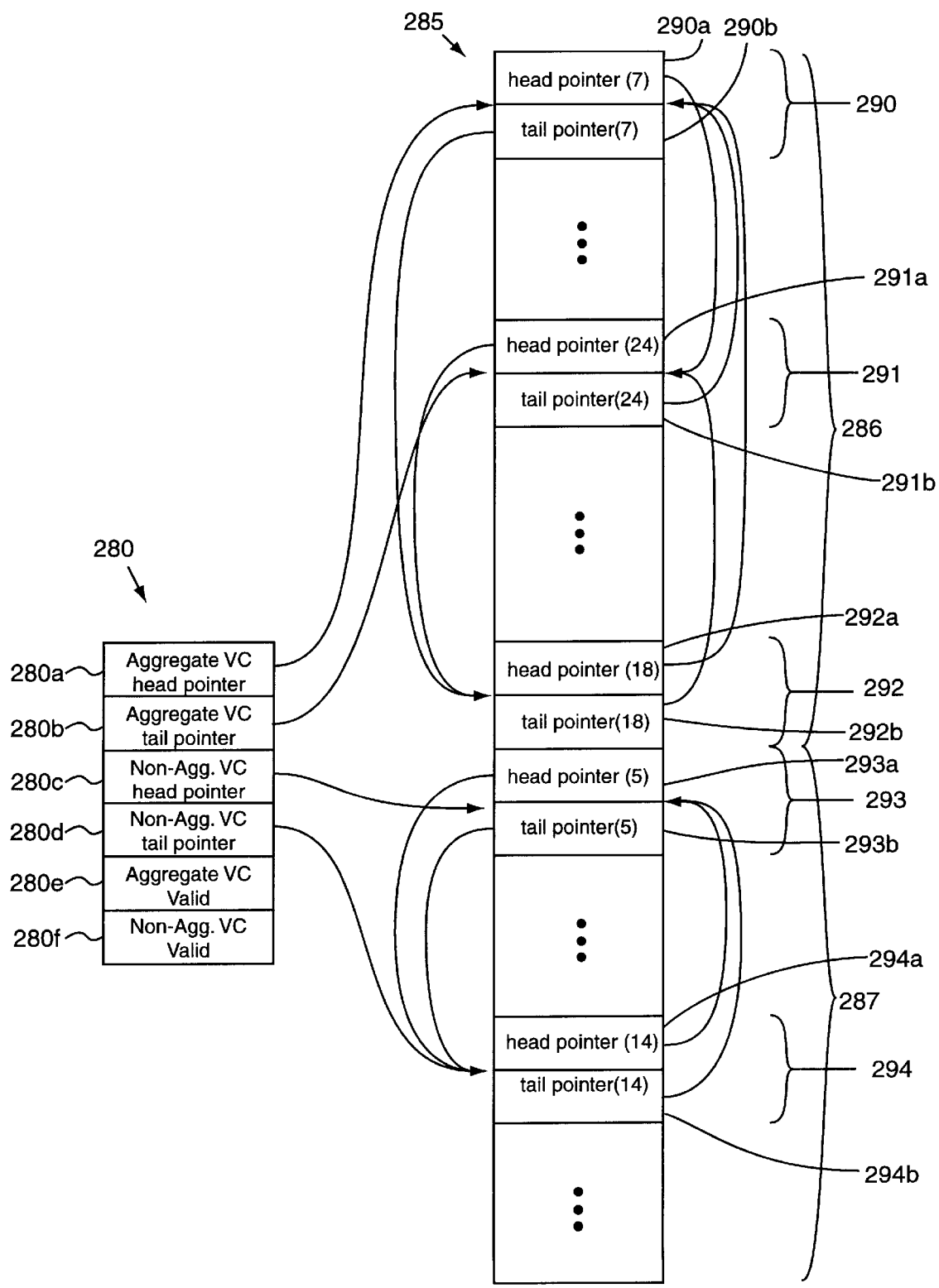
FIG. 6 depicts a TSQoQ link table 280 and a TSQoQ linklist 285 in accordance with one embodiment of the present invention.

FIG. 6 depicts a TSQoQ link table 280 and a TSQoQ linklist 285. TSQoQ maintains link table 280 and linklist 285 in order to keep track of the VC queues feeding into the TSQoQ. In the illustrated embodiment, TSQoQ linklist 285 includes an aggregate linklist 286 and a non-aggregate linklist 287. Non-aggregate linklist 287 keeps track of all the non-aggregate VC queues and aggregate linklist 286 keeps track of all the aggregate VC queues feeding into the TSQoQ. If the TSQoQ has more than one OR router, then an equal number of aggregate linklists are included in TSQoQ linklist 285, also the appropriate their head and tail pointers and valid flags are added to TSQoQ link table 280.

The aggregate and non-aggregate linklist pointers are doubly linked. That is, each link 290–294 points to two other locations within them respective linklist. A head pointer 290a–294a points to the link immediately ahead of it in the sequence of VC queues. A tail pointer 290b–294b points to the link immediately behind it in the sequence of VC queues. The tail and head pointers may be thought of as backward and forward pointers, respectively.

The sequence is looped such that the first link in the sequence of VC queues points to the last link in the sequence of VC queues as the next forward link. And, the last link in the sequence of VC queues points to the first link in the sequence of VC queues as the next backward link. In the exemplary embodiment, the sequence of aggregate linklist 286 would be, link (7) 290 (the head), link (18) 292 and link (24) 291 (the tail).

In one embodiment, the sequence of the VC queues are arranged by the order in which the VC queues were activated, i.e., when the VC began to send cells to the ATM switch. However, any criteria may be used for sequencing the VC queues within a TSQoQ linklist. By way of example, any of the QoS criteria can be used, or any other suitable data communications characteristic may be used to sequence the VC queues.

Each link 290–294 also includes a schedule flag and a VC queue indicator (not shown). The schedule flag is set when the VC queue is scheduled for transmission, as discussed further herein. The VC queue indicator contains a value indicative of the VC queue with which the link is associated. In the illustrated embodiment, link 290 would have a VC queue indicator which would indicate that it is a link for VC queue 7, as designated by the VC manager when that VC queue was activated.

TSQoQ link table 280 includes an aggregate VC queue head and tail pointers 280a and 280b, respectively. Link table 280 also includes non-aggregate VC queue head and tail pointers 280c and 280d, respectively. The VC queue head pointers point to the first link in the sequence of VC queues of the appropriate linklists 286 or 287. And, the VC queue tail pointers point to the last link 291 or 294. Link table 280 may also include valid flags 280e and 280f for each VC queue head/tail pointer pairs 280a–b and 280c–d, respectively.

In an alternative embodiment, additional aggregate head and tail pointers and valid flags may be included in TSQoQ link table 280 for any additional OR routers that are implemented in the TSQoQ. In yet another embodiment, an aggregate VC queue may have more than one linklist in a single aggregate link list 286 when the aggregate VC queue is a VC queue that has a data rate greater than the other aggregate VC queues in the same aggregate linklist, as discussed above.

When a communication device begins to send cells to ATM switch 105 a VC is created to facilitate communication with the destination communication device. A VC queue 192 is then activated by VC manager 195 and sorted. In one embodiment the VC queue is sorted by priority and data rate. The VC queue is then added to either an aggregate or non-aggregate linklist 286 or 287 of the corresponding TSQoQ.

A VC queue is added to one of the linklists 286 or 287 by inserting a new link to the sequence of links. The new link is added to the end of the sequence of links and becomes the tail. The tail pointer of the previous tail link and the head pointer of the first link in the sequence are configured to point to the new link. The appropriate tail pointer 280b or 280d is configured to also point to the new link as the new tail of the link sequence.

When a communication device terminates communication with the destination communication device the corresponding VC queue is deactivated. Correspondingly, the link associated with the VC queue is removed from the linklist. In the illustrated embodiment, should VC(24) terminate, link 291 would be removed from the sequence of links in aggregate linklist 286. The pointer that pointed to link 291 would be reassigned to conform to the new sequence. Thus, in the illustrated embodiment, tail pointer of VC queue (18) 292b would take the value of the tail pointer of VC queue (24) 291b and point to link (7) 290. Head pointer of VC queue (7) 290a would take the value of head pointer of VC queue (24) 291 a and point to link (18) 292. The new sequence would be link (7) 290 (the head) and link (18) 292 (the tail). Through the use of doubly linked linklists the TSQoQ maintains the order of the VC queues and organizes them for scheduling. While FIG. 6 depicts linklists 286 and 287 as each occupying a single block of memory, the linklists 286 and 287 may be implemented in a non-contiguous memory location.

In one embodiment, the activation and deactivation of an entire linklist may also be controlled. Valid flags 280e and 280f indicate whether the aggregate or the non-aggregate linklists are empty. Thus, in the scheduling procedures, as described below, valid flags 280e–f will indicate that the particular linklist is empty and does not need to be scheduled. The following flowcharts are best understood with reference to the previous figures.

Figure 7:
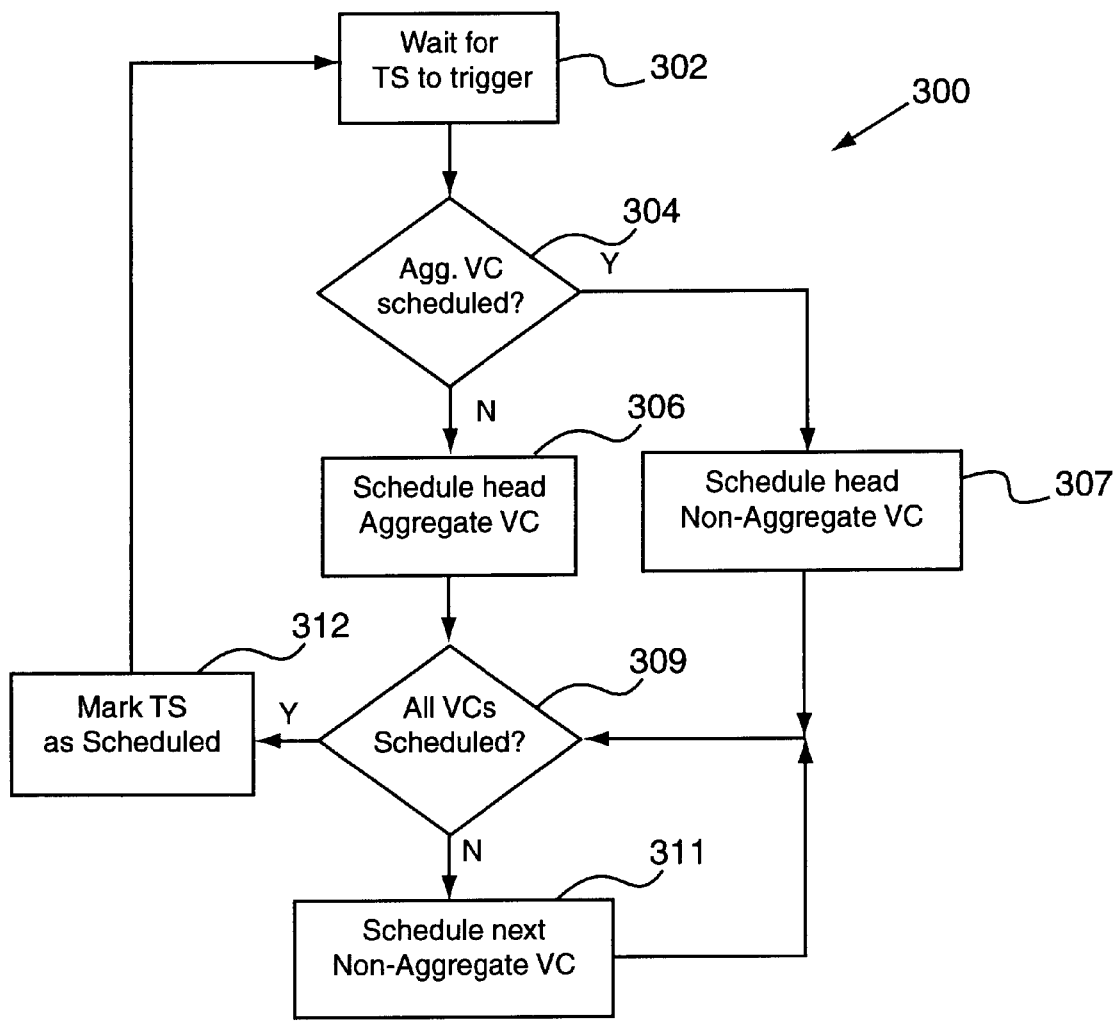
FIG. 7 is a block diagram of the operation of TSQoQ in accordance with the present invention.

FIG. 7 is a block diagram 300 of the operation of TSQoQ in accordance with one embodiment of the present invention. In block 302, TSQoQ 200 is fully scheduled (as will be described) and is waiting for the traffic shaper 205 associated with the TSQoQ to trigger and begin sending out cells to the scheduler. Once traffic shaper 205 has started to send out information TSQoQ 200 proceeds to block 304 to schedule all the VC queues 192 for the next round of transmission.

In block 304 TSQoQ 200 scans aggregate linklist 286 to determine if one of the aggregate VC queues has already been scheduled. If not, TSQoQ 200 moves to block 306 and sets the schedule flag of the head link of aggregate linklist 286 to indicate it is scheduled for transmission. Only one aggregate VC queue is scheduled for transmission per scheduling cycle for the reasons discussed above.

To ensure that the next successive link in the aggregate linklist is scheduled in the next scheduling cycle the head link is moved to the tail, and the next link is made the head. The aggregate VC head pointer 280a is adjusted to point to the new head link, and the aggregate VC tail pointer 280b is pointed at the scheduled link as the new tail link of the aggregate link list.

After an aggregate VC queue has been scheduled, TSQoQ 200 proceeds to block 309 and scans to see if all the non-aggregate VC queues have been scheduled. If not, TSQoQ proceeds to block 311 and schedules the next non-aggregate VC queue link in the non-aggregate linklist, starting from the head. TSQoQ cycles between blocks 309 and 311 until all the non-aggregate VC queues are scheduled. When all the non-aggregate VC queues have been scheduled TSQoQ 200 proceeds to block 312 and marks the corresponding traffic shaper 205 as being completely scheduled. TSQoQ 200 then returns to block 302 and waits for traffic shaper 205 to trigger.

In block 304, had an aggregate VC queue been scheduled, or if there were no active aggregate VC queues, then TSQoQ 200 would have proceeded to block 307 and scheduled the head of the non-aggregate VC linklist 287. From block 307 TSQoQ 200 would have proceeded to blocks 309 and 311 until all the non-aggregate VC queues are scheduled and waits at step 302 for traffic shaper 205 to trigger. While the exemplary embodiment describes aggregate VC queues being attended to before the non-aggregate VC queues, the present is not limited to a particular order of aggregate/non-aggregate VC queues. Any suitable order of scheduling aggregate VC queues and non-aggregate VC queues may be utilized in accordance with the present invention. In fact, in multiple aggregate VC queue systems, a specified order of scheduling based upon the aggregate/non-aggregate criteria may be impractical.

Figure 8A:
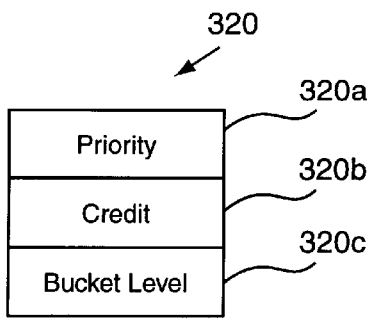
FIGS. 8a and 8b illustrate a traffic shaper table 320 and a block diagram 330 of the operation of a traffic shaper 205, respectively, in accordance with the present invention in accordance with one embodiment of the present invention.
Figure 8B:
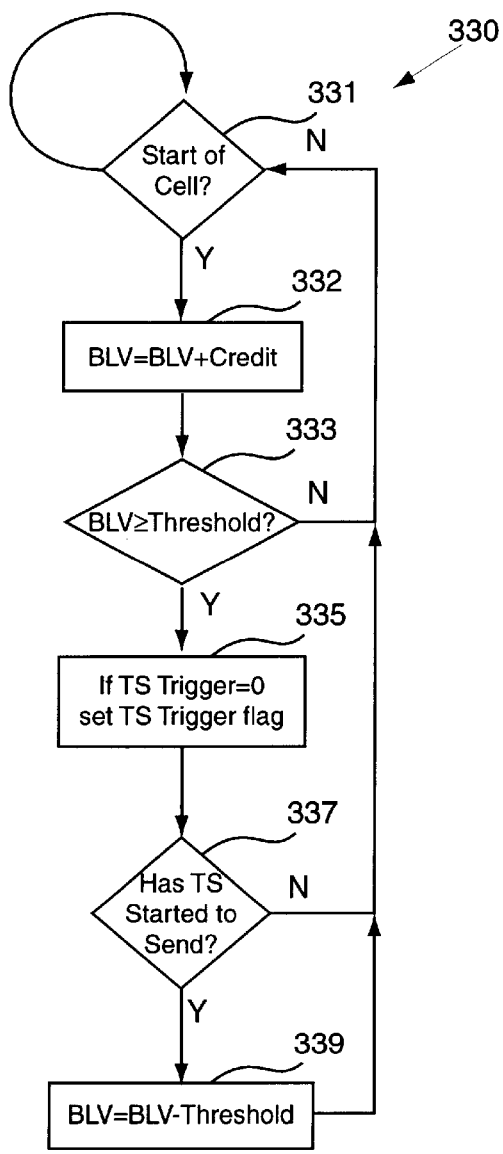

FIGS. 8a and 8b illustrate a traffic shaper table 320 and a block diagram 330 of the operation of a traffic shaper 205, respectively, in accordance with one embodiment of the present invention. Traffic shaper 205 is a variation of a leaky bucket algorithm or general cell rate algorithm (GCRA) as known in the art. Traffic shaper 205 may be triggered according to a fundamental data rate, or the rate at which the non-aggregate VCs are operating.

Each traffic shaper includes a traffic shaper table 320. Traffic shaper table includes a priority register 320a, credit register 320b and a bucket level register 320c. Priority register 320a contains a value that indicates the priority of the VC queues under it, which also corresponds to which round robin router the traffic shaper is under. Bucket level register 320c contains the level of the traffic shaper. Credit register 320b contains a value that is determined from the criteria being used for prioritizing. In the illustrated embodiment, the priority value and the fundamental data rate are used for traffic shaping. When the bucket level is incremented, it is incremented by the credit value. When the bucket level reaches a threshold level the traffic shaper is triggered.

The operation of traffic shaper 205 is illustrated in block diagram 330. Each cycle is started at the start of a new cell at the fundamental rate. Traffic shaper 205, therefore, waits in state 331 until the start of a new cell. At the start of the next cell traffic shaper 205 proceeds to step 332. In block 332 traffic shaper 205 increments the bucket level by the credit value and moves to the next block.

Traffic shaper 205 determines if the bucket level is greater than the threshold level in block 333. If the bucket level is less than the threshold level the traffic shaper returns to block 331. If the bucket level is greater than the threshold level the traffic shaper proceeds to block 335. In block 335 the traffic shaper sets a trigger flag associated with the traffic shaper if it hasn't already been set.

Even though the trigger flag of the traffic shaper has been set the scheduler might not have allowed the traffic shaper to transmit data. Thus, in block 337 traffic shaper 205 determines if it has begun to actually send out data. If it has, the traffic shaper proceeds to block 339 where it decrements the bucket level by the threshold level. The decrement typically brings the bucket level to a value less than the threshold level, and the traffic shaper returns to block 331 and begins filling up again. If the traffic shaper has not begun to send out data in step 337, then the traffic shaper returns to step 331 and the bucket continues to fill beyond the threshold level.

It may be appreciated the rate at which the traffic shaper fills up, and eventually triggers, is related to the fundamental rate of it's associated VC queues in one embodiment. Thus, VC queues operating at a faster rate are allowed to transmit more often since their traffic shapers trigger more often than traffic shapers facilitating slower VC queues. Thereby the traffic shapers shape the traffic of the output to accord more bandwidth to VCs that are operating at higher data rates.

A further distinction of the traffic shaper is it's reverse leaky bucket type algorithm. A typical prior art leaky bucket algorithm fills up to a certain level, corresponding to the amount of backlog of cells. Generally, the leaky bucket then trickles out the cells in order to keep the backlog slightly below a threshold level.

A traffic shaper in accordance with the present invention allows the bucket to fill up to a threshold level and then dumps out a large number of cells when it is triggered. The number of cells corresponds to the number of VC queues that were scheduled for transmission by TSQoQ 200 under the traffic shaper. In one embodiment, all the non-aggregate VC queues may be scheduled, and one aggregate VC queue per OR router is scheduled before the traffic shaper is triggered. However, the VC queues may be scheduled in any suitable order. Therefore, the data rate of the output of the traffic shaper is the aggregate of the data rates of all the VC queues under it.

In one embodiment, each scheduled VC queue is allowed to send one cell per trigger. However, any suitable number of cells can be scheduled for transmission per VC queue as long as the number of cells is consistent among the scheduled VC queues.

FIG. 9a illustrates a scheduler linklist 400. Scheduler 212 maintains a scheduler linklist 400 for every round robin router 207. Each round robin router corresponds to the priority level of the VC queues, and thereby the traffic shapers, under the round robin router. And, each corresponding scheduler linklist is a doubly linked list of the traffic shapers under the round robin router.

Scheduler linklist 400 includes a number of traffic shaper links 402, 403 and 404. Each traffic shaper link includes a head pointer 402a–404a, and a tail pointer 402b–404b. The traffic shaper links also include a traffic shaper value (not shown) that indicates which traffic shaper the traffic shaper link belongs to. Additionally, each traffic shaper link 402-404 has a trigger flag which indicates whether the corresponding traffic shaper has been triggered. The trigger flag is set by the traffic shaper in step 335 of FIG. 8.

A scheduler linklist table 390 is also implemented by the scheduler for each scheduler linklist. The scheduler linklist table includes a head and a tail traffic shaper link pointers 390a and 390b, respectively. Head traffic shaper link pointer 390a points to the first traffic shaper link, and the tail traffic shaper link pointer 390b points to the last traffic shaper link in the sequence.

The scheduler linklist operates similarly to the TSQoQ linklist, except that the scheduler linklist is not looped. The head pointer of the first traffic shaper link points to a null space, as well as the tail pointer of the last traffic shaper link. In the illustrated embodiment, the head pointer of traffic shaper (2) 402a points to null since it is the first traffic shaper link in the sequence. And, tail pointer of traffic shaper (4) 403b points to null.

When a new traffic shaper is activated the scheduler adds a new link to the scheduler linklist. The new link is added to the end of the sequence. Thus, the tail pointer of the new traffic shaper link points to null, and its head pointer points to the previously last traffic shaper link. Accordingly, the tail pointer of the previously last traffic shaper link points to the newly added link. In alternate embodiments of the present inventions, the newly activated traffic shaper can be placed in a position other than the tail dependent upon the urgency of the activation when the traffic shaper is activated.

When a traffic shaper is deactivated the corresponding traffic shaper link is removed from scheduler linklist 400, similar to the removal of a VC queue link in the TSQoQ linklist. The head and tail pointers of the sequentially adjacent traffic shaper links are adjusted to point to each other rather than the removed link. In both the insertion and deactivation of a traffic shaper 205, the head and tail traffic shaper link pointers 390a and 390b, respectively, are pointed to the new head and tail links.

FIG. 9b illustrates a scheduler linklist 400 after a deactivation of one of the traffic shaper links 404. By way of example, in one embodiment traffic shaper link (9) 404 is in the middle of the sequence of links in FIG. 9a, which is 402, 404 and 403. After traffic shaper link (9) 404 is removed, the appropriate head and tail pointers are adjusted and the new sequence is 402 and 403.

Figure 10:
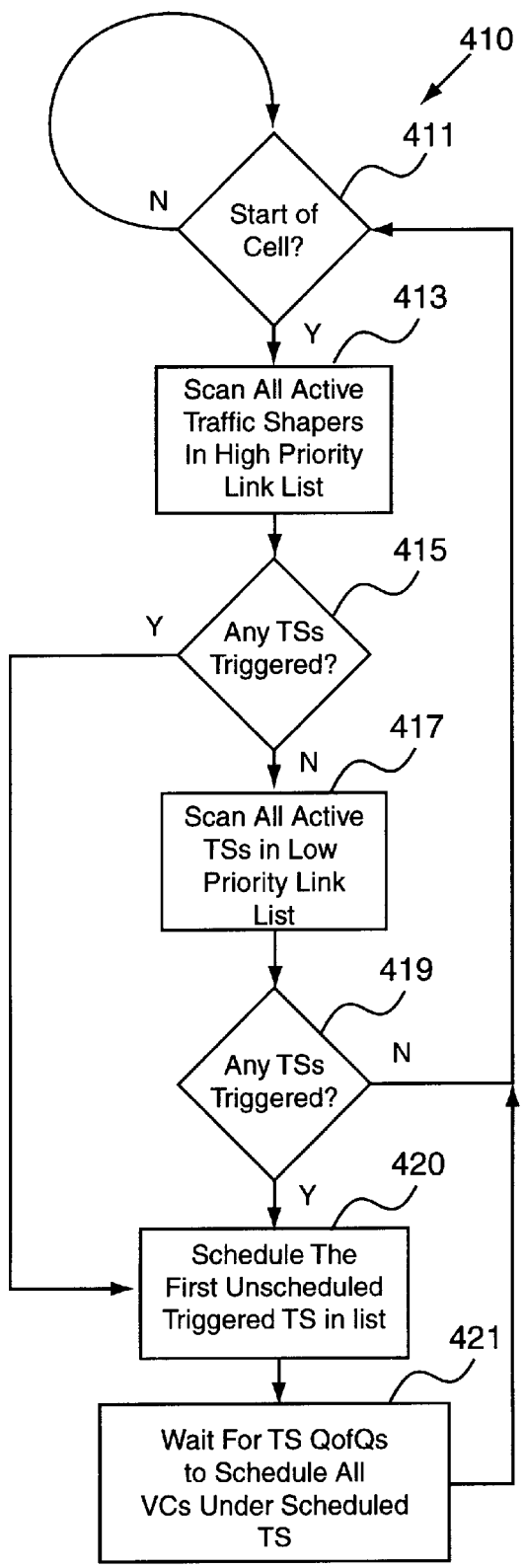
FIG. 10 is a block diagram 410 of the operation of a scheduler in accordance with one embodiment of the present invention.

FIG. 10 is a block diagram 410 of the operation of a scheduler 102 in accordance with the present invention. Scheduler 212 typically cycles once (or more) per each cell interval, corresponding to the output of a cell from the output port of traffic shaping matrix 102. In one embodiment, the scheduler cycles one cell interval ahead of cell transmission. However, the scheduler may cycle any cell interval ahead of cell transmission. In block 411 scheduler 212 waits for the beginning of a new cell interval. Once a new cell interval has begun the scheduler proceeds to block 413 and scans all the active traffic shapers in the highest priority scheduler linklist.

Unlike prior art systems, in one embodiment, when the active traffic shapers of a scheduler linklist 400 are scanned, two scanners are typically implemented by the scheduler in block 413. One scanner normally begins at the head of the scheduler linklist, and the other scanner begins at the tail of scheduler linklist 400. Thus, the scan can be completed within one half of a cell time. Dual scanning provides a more efficient method of scheduling cells for output than prior art methodologies.

Scheduler 212 proceeds to block 415 and determines if any of the active traffic shapers have triggered. If any of the traffic shapers have triggered the first triggered traffic shaper is scheduled for transmission in block 420. If two traffic shapers have triggered at the same time an arbitrary selection can be made. In alternative embodiments, selection based upon other QoS criteria besides priority can be used to make the selection.

Before the scheduled traffic shaper is allowed to transmit, the scheduler determines if all the VC queues have been scheduled under the traffic shaper in block 421. If not, the scheduler waits for all the VC queues of the traffic shaper to be scheduled and the appropriate cells of the VC queues are output to an output port to a physical connection. After the transmission of the scheduled cells, scheduler 212 returns to block 411.

It can be appreciated that the highest priority traffic shapers are scheduled before lower priority traffic shapers. However, there will be times when there are no high priority traffic shapers that are triggered. In such a case the scheduler proceeds from block 415 to block 417. In block 417 scheduler 212 scans scheduler linklist 400 with the next highest priority. Again, two or more scanners are implemented to scan scheduler linklist 400.

If any of the traffic shapers of the lower priority scheduler linklist has been triggered, scheduler 212 proceeds from block 419 to block 420. In block 420 the first triggered traffic shaper is scheduled for output, and is actuated in block 421 once all the VC queues have been scheduled. Scheduler 212 then returns to block 411.

While the illustrated block diagram depicts only two levels of priority scheduling, it can be appreciated that multiple levels of priority scheduling can be accomplished by the present invention.

The method of scheduling allows traffic shaping matrix 102 to shape the outgoing traffic by priority. In conjunction with traffic shapers 205 and TSQoQs 200 the output is thereby shaped according to bandwidth constraints, the data rate and the priority of each individual VC. The traffic shaping is also accomplished in a highly parallel configuration which reduces the amount of complexity and resources to accomplish the shaping, as opposed to the prior art timing chain approach which is a highly complex and serial process. The present invention is also accomplished with a minimal number of GCRA algorithms compared to the prior art. Thus, an improved traffic shaper apparatus and method for implementing the same are disclosed.

Any suitable weighting factor can be used to shape and schedule the output of cells, although, the illustrated embodiments focused primarily on the use of data rate and priority as factors. By way of examples, Peak-to-Peak Cell Delay Variation, Maximum Cell Transfer Delay, Cell Loss Rate, Cell Error Ratio, Severely Errored Cell Block Ratio, Cell Misinsertion Rate, Cell Loss Priority, or any other suitable characteristic of a cell or a virtual circuit can be utilized as the weighting factor. Additionally, in another embodiment, combinations of these characteristics can be used to weight the "priority" of the cells and virtual circuits.

While the foregoing has focused primarily upon ATM switches, the present invention may be utilized in any type of packet based data communications. The features and benefits of the present invention in the area of data communications may, therefore, be appreciated from the foregoing and variations thereof.

Of particular interest is the ability of the present invention to adequately shape traffic utilizing less computational resources. The prior art systems utilized brute force solutions to solve the problem of traffic shaping. A distinct advantage of the present invention is the ability to provide an elegant and efficient method of shaping traffic.

Improved traffic shaping, in accordance with one embodiment of the present invention, may be achieved by grouping VC queues for shaping by a single traffic shaper. Grouped traffic shaping reduces the number of traffic shapers required in some prior systems. Further scales of economy are added by aggregating VC queues of lower data rates such that the aggregated data rate may be grouped with other VC queues of the higher data rates. Thus, a single traffic shaper may be capable of shaping a greater number and variety of VC queues without significant increases in required computational resources. The prior art systems do not disclose or even suggest grouped traffic shaping or aggregation.

Grouped traffic shaping is further refined by utilizing a variety of factors for prioritizing rather than a single criteria. Priority scheduling, based upon any number of criteria, may be accomplished at a variety of levels in accordance with the present invention. Prioritizing in this parallel fashion decreases the computational difficulties that arise in serial prioritizing.

The use of a reverse leaky bucket is another feature of the present invention. As discussed, the use of a typical may not be able to ensure robust traffic shaping. Using a reverse leaky bucket in combination with prioritized scheduling allows for efficient traffic shaping that better utilizes all the available bandwidth of all the virtual connections.

Another inventive aspect of the present invention is the techniques of scheduling. Scheduling is combined with grouped traffic shaping. A more specific aspect of the present invention is scheduling utilizing dual scanners for scanning a linklist of grouped traffic shaped output. By utilizing dual scanners, the amount of time for scanning and scheduling may be significantly reduced. These and other advantages of the present invention, as well as the myriad number of variations of the embodiments disclosed, are novel contributions to the field of data communications.

While this invention has been described in terms of several preferred embodiments, there are alterations, permutations, and equivalents which fall within the scope of this invention. By way of example, although the invention is disclosed with reference to an ATM switch having a depicted number of schedulers, buffers, managers and routers, the number of these circuits present in a given implementation may vary depending on need. Further, there is no theoretical limitation on the number of ports connected to a given data transmitting device, or the number of communication devices that can be coupled to each port. It should also be noted that there are many other alternative ways of implementing the methods and apparatuses of the present invention. It is therefore intended that the specification herein be interpreted as including all such alterations, permutations, and equivalents as fall within the true spirit and scope of the present invention.

What is claimed is:

1. A computer-implemented method for shaping the output of cells on an output path of a data transmitting device, the data transmitting device being configured for switching the cells from a plurality of input paths to the output path, comprising:

receiving a plurality of cells through the plurality of input paths, the cells arriving from a plurality of communication devices, each cell having a weight and an associated data rate;

sorting each cell of the plurality of cells into one of a plurality of queues of cells, each queue of the plurality of queues corresponding to one of the plurality of communication devices, the cells of each queue having the same weight and data rate;

sorting each queue of the plurality of queues into one of a first plurality of queues of queues according to a weight of each queue, such that each queue of queues of the first plurality of queues of queues includes queues having the same weight;

sorting each queue of each queue of queues of the first plurality of queues of queues into one of a second plurality of queues of queues according to a data rate of each queue;

shaping an output of cells from each queue of each queue of queues of the second plurality of queues of queues, shaping being implemented by a plurality of traffic shapers, each traffic shaper corresponding to a queue of queues of the second plurality of queue of queues whereby the corresponding queue of queues have the same weight, which determines a weight of the each traffic shaper; and scheduling an output of each traffic shaper, scheduling being implemented by a scheduler, such that the scheduled output is coupled to the output path.

2. A method as claimed in claim 1, wherein each queue of queues of the second plurality of queues of queues is comprised of a first subset of queues having a substantially equal data rate.

3. A method as claimed in claim 2, wherein each queue of queues of the second plurality queues of queues is further comprised of a second subset of queues, such that the aggregate data rate of the second subset of queues is substantially equal to the individual data rate of each queue of the first set of queues.

4. A method as claimed in claim 3, wherein in the step of shaping, each traffic shaper receives cells from the corresponding queue of queues of the second plurality of queues of queues, such that each traffic shaper receives cells from each queue of the first subset of queues of the corresponding queue of queues at a substantially equal rate, and aggregately receives cells from the second subset of queues at approximately the same rate as each queue of the first subset of queues.

5. A method as claimed in claim 4, wherein in the step of shaping, each traffic shaper receives cells from the corresponding queue of queues of the second plurality of queues of queues per a predetermined time interval associated with the data rates of the corresponding queue of queues, such that each traffic shaper receives one cell from each of queue of the first subset of queues of the corresponding queue of queues and receives a cell from a scheduled queue of the second subset of queues per predetermined time interval, such that the each queue of the second subset of queues are sequentially alternated as the scheduled queue per predetermined time interval.

6. A method as claimed in claim 1, wherein in the step of shaping, each traffic shaper allows each queue of each queue of queues of the second plurality of queues of queues to output data based upon the weight and data rate of the each queue of queues.

7. A method as claimed in claim 6, wherein each traffic shaper allows each queue of each queue of queues of the second plurality of queues of queues to output data when the each traffic shaper triggers, the triggering of the each traffic shaper including:

provide a threshold level for each traffic shaper;

providing a credit for each traffic shaper, the credit being determined by the data rate of the queue of queues of the second plurality of queues of queues corresponding to the each traffic shaper;

providing a bucket level for each traffic shaper;

incrementing the bucket level by the credit at a predetermined time interval associated with the data rate of the queue of queues of the second plurality of queues of queues corresponding to the each traffic shaper;

triggering the each traffic shaper when the bucket level is greater than the threshold level;

decrementing the bucket level of the each traffic shaper when the each traffic shaper allows each queue of each queue of queues of the second plurality of queues of queues to output data.

8. A method as claimed in claim 7, the scheduler including a plurality of round robin schedulers, wherein each round robin scheduler schedules a subset of the plurality of traffic shapers to output cells, whereby each traffic shaper of the subset of traffic shapers are of the same weight, which determines a weight of the round robin scheduler, wherein the each round robin scheduler schedules output from the subset of traffic shapers by the order in which each traffic shaper of the subset of traffic shapers triggers; and a priority scheduler, wherein the priority scheduler schedules the plurality of round robin schedulers to output cells, wherein the priority scheduler schedules the output from the plurality of round robin schedulers by the weights of the plurality of round robin schedulers.

9. A method as claimed in claim 1, the scheduler including, a plurality of round robin schedulers, wherein each round robin scheduler schedules a subset of the plurality of traffic shapers to output cells, whereby each traffic shaper of the subset of traffic shapers are of the same weight, which determines a weight of the round robin scheduler, wherein the each round robin scheduler schedules output from the subset of traffic shapers by the order in which each traffic shaper of the subset of traffic shapers triggers; and a priority scheduler, wherein the priority scheduler schedules the plurality of round robin schedulers to output cells, wherein the priority scheduler schedules the output from the plurality of round robin schedulers by the weights of the plurality of round robin schedulers.

10. A computer-implemented method for shaping the output of cells on an output path of a data switch, the data switch being configured for switching the cells from a plurality of input paths to the output path, comprising:

receiving a plurality of cells through the plurality of input path, the cells arriving from a plurality of communication devices, each cell having a weight and an associated data rate;

sorting each cell of the plurality of cells into a plurality of queues of cells, each queue of the plurality of queues corresponding to one of the plurality of communication devices, the cells of each queue having the same weight and data rate;

sorting each queue of the plurality of queues into a first plurality of queues of queues according to the weight of each queue, such that each queue of queues of the first plurality of queues of queues includes queues having the same weight;

sorting each queue of each queue of queues of the first plurality of queues of queues into a second plurality of queues of queues according to the data rate of each queue, wherein each queue of queues of the second plurality of queues of queues is comprised of a first subset of queues having a substantially equal data rate and a second subset of queues, such that the aggregate data rate of the second set of queues is approximately equal to the individual data rate of each queue of the first set of queues;

shaping an output of cells from each queue of each queue of queues of the second plurality of queues of queues, shaping being implemented by a plurality of traffic shapers, each traffic shaper corresponding to a queue of queues of the second plurality of queue of queues, shaping including, each traffic shaper receiving cells from the corresponding queue of queues of the second plurality of queues of queues, such that each traffic shaper receives cells from each queue of the first subset of queues of the corresponding queue of queues at approximately the same rate, and aggregately receiving cells from the second subset of queues at approximately the same rate as each queue of the first subset of queues, and each traffic shaper allowing each queue of each queue of queues of the second plurality of queues of queues to output data based upon the weight and data rate of the each queue of queues, whereby the corresponding queue of queues have the same weight, which determines a weight of the each traffic shaper; and scheduling an output of each traffic shaper, scheduling being implemented by a scheduler, the scheduler including a plurality of round robin schedulers, wherein each round robin scheduler schedules a subset of the plurality of traffic shapers to output cells, whereby each traffic shaper of the subset of traffic shapers are of the same weight, which determines a weight of the round robin scheduler, wherein the each round robin scheduler schedules output from the subset of traffic shapers by the order in which each traffic shaper of the subset of traffic shapers triggers, and a priority scheduler, wherein the priority scheduler schedules the plurality of round robin schedulers to output cells, wherein the priority scheduler schedules the output from the plurality of round robin schedulers by the weights of the plurality of round robin schedulers, such that the scheduled output is coupled to the output path.

11. A method as claimed in claim 10, wherein in the substep of each traffic shaper receiving cells from the corresponding queue of queues of the second plurality of queues of queues, each traffic shaper receives cells from the corresponding queue of queues per a predetermined time interval associated with the data rates of the corresponding queue of queues, such that each traffic shaper receives one cell from each of queue of the first subset of queues of the corresponding queue of queues and receiving a cell from a scheduled queue of the second subset of queues per predetermined time interval, such that the each queue of the second subset of queues are sequentially alternated as the scheduled queue per predetermined time interval.

12. A method as claimed in claim 10, wherein in the substep of each traffic shaper allowing each queue of queues of the second plurality of queue of queues to output data, each traffic shaper allows each queue of each queue of queues of the second plurality of queues of queues to output data when the each traffic shaper triggers, the triggering of the each traffic shaper including:

providing a threshold level for each traffic shaper;

providing a credit for each traffic shaper, the credit being determined by the data rate of the queue of queues of the second plurality of queues of queues corresponding to the each traffic shaper;

providing a bucket level for each traffic shaper;

incrementing the bucket level by the credit at a predetermined time interval associated with the data rate of the queue of queues of the second plurality of queues of queues corresponding to the each traffic shaper;

triggering the each traffic shaper when the bucket level is greater than the threshold level;

decrementing the bucket level of the each traffic shaper when the each traffic shaper allows each queue of each queue of queues of the second plurality of queues of queues to output data.

13. A network switch for receiving a plurality of cells from a first plurality of communication devices from a plurality of input paths and outputting the cells to an output path to a second plurality of communication devices, wherein a plurality of virtual circuits are created between the first and second plurality of communication devices, each virtual circuit having a weight and a data rate, comprising:

a virtual circuit manager, the virtual circuit manager sorting the plurality of cells into a plurality of queues, each queue including cells corresponding to a one of the plurality of virtual circuits, arranging the plurality of queues into a first plurality of queues of queues, each queue of queues including queues having cells corresponding to virtual circuits having the same weight, and further arranging each of the first plurality of queues of queues into a second plurality of queues of queues, each queue of queues of the second plurality of queues of queues having cells corresponding to a first subset of virtual circuits having a first data rate and second subset of virtual circuits having an aggregate data rate substantially equal to the first data rate;

a plurality of traffic shaper link lists, each traffic shaper link list organizing a corresponding queue of queues of the second plurality of queues of queues, wherein the each traffic shaper includes, a non-aggregate linklist, the aggregate linklist keeping track of a sequence of a first subset of the second plurality of queues of queues corresponding to the first subset of virtual circuits having the first data rate, a non-aggregate linklist, the non-aggregate linklist keeping track of a sequence of a second subset of the second plurality of queues of queues corresponding to the second subset of virtual circuits having an aggregate data rate approximately equal to the first data rate, and a link table, the link table keeping track of a beginning and an end of the first and second sequence, wherein each traffic shaper link list also schedules the queues of the corresponding queue of queues of the second plurality of queues of queues to output cells;

a plurality of traffic shapers, each of the plurality of traffic shapers corresponding to a one of the plurality of traffic shaper link lists, each traffic shaper controlling the scheduled output of cells from the corresponding queue of queues of the second plurality of queues of queues, wherein the traffic shaper allows the corresponding queue of queues to output cells when the traffic shaper is triggered and the traffic shaper is given permission; and a scheduler, the scheduler giving permission to the plurality of traffic shapers, wherein permission is given to a plurality of subsets of the plurality of traffic shapers, each subset of the plurality of traffic shapers corresponding to a queue of queues of the first plurality of queues of queues, according to the weight of the cells within the corresponding queue of queues of the first plurality of queues of queues;

such that the output of cells is coupled to the output port and the sequence of the output of cells is shaped to take advantage of a plurality of characteristics of each of the virtual circuits.

* * * * *